April 7, 1953     B. F. GREIMAN     2,633,791
PLANT SHIELD FOR CULTIVATORS

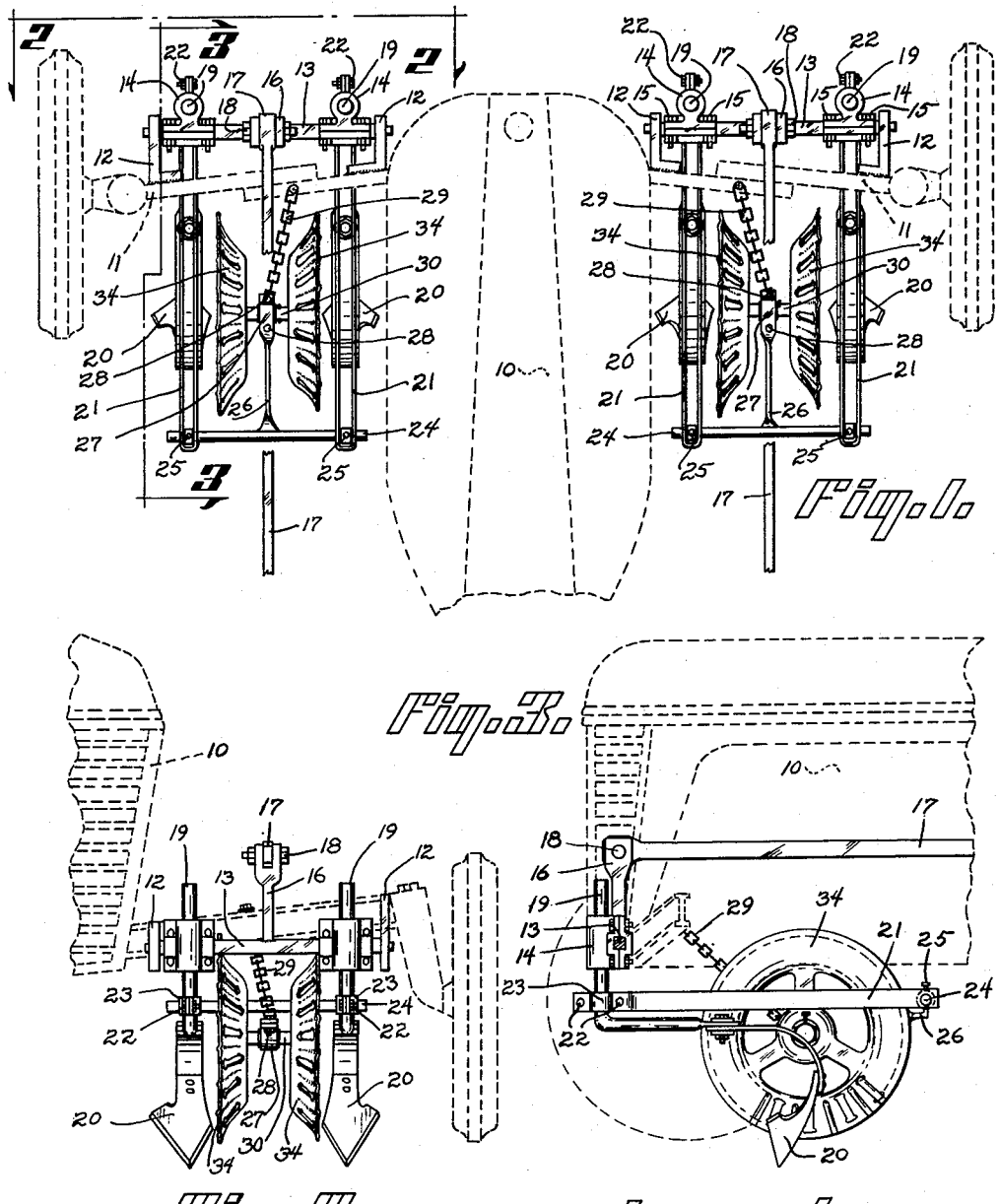

Filed Aug. 24, 1950     2 SHEETS—SHEET 2

Inventor
Ben F. Greiman
by M. Talbert Dick
Attorney

Witness
Merle A. Bjork

Patented Apr. 7, 1953

2,633,791

UNITED STATES PATENT OFFICE 2,633,791

PLANT SHIELD FOR CULTIVATORS

Benjamin F. Greiman, Garner, Iowa

Application August 24, 1950, Serial No. 181,135

5 Claims. (Cl. 97—188)

My invention relates to the art of shielding plants from dirt clods during cultivating. Specifically, I have invented a plant shield for cultivators that prevents big clods from falling on and damaging the plants while cultivation is being carried on and at the same time permits a regulated quantity of relatively fine particles of dirt to lodge around the base of the plants. My plant shield also is adjustably mounted on the cultivator to permit the use of the guard during a greater portion of the growing season than is possible with fixed type shields. My shield is also designed to prevent weeds or the like from becoming entangled in its supporting structure.

My invention has as its principal object, therefore, to provide a plant shield for cultivators that may be adjusted both as to height and as to lateral clearance between the shield elements. It is a further object of my invention to provide a plant shield for cultivators that has an adjustable means thereon to permit control of the amount of dirt of a given size that is permitted to be lodged around the bases of the young plants. Yet a further object of my invention is to provide a plant shield for cultivators that is supported so as to prevent weeds from becoming entangled in the supporting structure. A still further object of my invention is to provide a plant shield for cultivators that is simple and inexpensive to manufacture and durable in use.

Still a further object of my invention is to provide a plant shield for cultivators that although free to move upwardly to permit it to ride over the surface of the ground is so constructed and arranged that dirt clods falling on the shields hold it down in contact with the ground.

Still a further object of my invention is to provide a cultivator plant shield for a cultivator that is constructed and arranged to urge the clods to fall away from the cultivator plant shield rather than merely holding back the clods until the shield passes the plant and then permitting them to fall on the plant.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a top view of a portion of a cultivator equipped tractor with my plant shields mounted on the cultivators. A portion of the cultivator is broken away to more fully illustrate the construction of my shields. The portion of the tractor is shown with broken lines.

Fig. 2 is a front view of one cultivator with shield mounted on it and taken on the line 2—2 of Fig. 1.

Fig. 3 is a side view of one cultivator with a shield mounted on it and taken on the line 3—3 of Fig. 1.

Figures 4, 5:
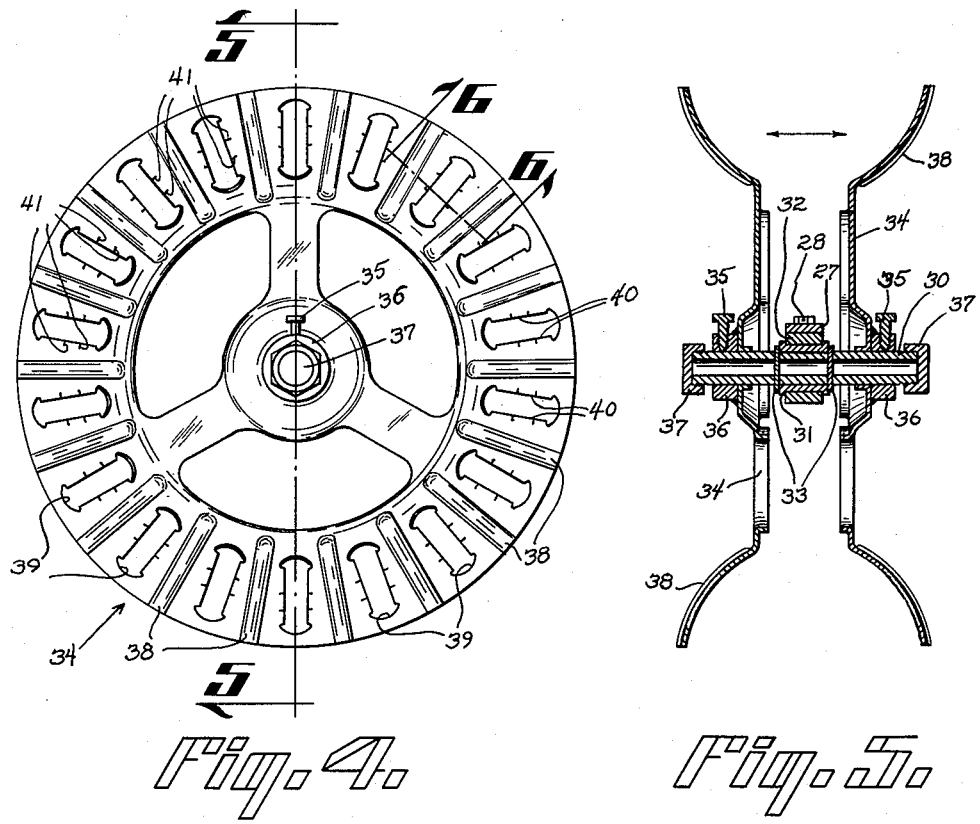
Fig. 4 is an enlarged side view of the shield elements and their supporting axle.
Fig. 5 is a cross-sectional view of the shield elements and axle taken on the line 5—5 of Fig. 4.
Figure 6:
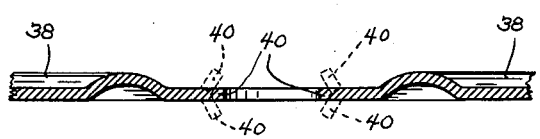
Fig. 6 is a fragmentary cross-sectional view of a portion of one shield element taken on the line 6—6 of Fig. 4. The bending adjustment of the deflector blades is shown with broken lines.

Referring to the drawings, I have used the numeral 10 to designate a prime mover such as a tractor or the like, equipped with front axle extensions 11 to accommodate the cultivator L-brackets 12. The L-brackets support the cross rod 13 mounted on the cross rod of the collar brackets 14 which are clamped to the cross rod by nut and bolt assemblies 15 or secured thereto by any other appropriate manner. The lever arm 16 extends upwardly from cross rod 13 and is rigidly secured to the cross rod in any suitable way as by welding. The control linkage bar 17 is hingedly secured in the forked end of lever arm 16 by means of a nut and bolt 18 or the like. Two cultivator rods designated 19 extend downwardly and then rearwardly from their point of attachment in collar brackets 14 and each rod supports a blade designated 20. Thus far I have described one form of standard cultivator attachment for tractors, no part of which is claimed as my invention. I will now proceed to describe the shield and its supporting structure, which is my invention.

Two frame members designated 21 are clamped to the vertical portions of the cultivator rods 19 and extend straight rearwardly therefrom in a horizontal position. These frame members may be secured in any suitable manner as by the nut and bolt assemblies designated 22 bending the frame irons around the cultivator rods to form clamp designated 23. A cross rod designated by the numeral 24 is supported at its respective ends by the frame members 21. Set screws 25 hold the cross rod 24 in position. A support arm designated 26 extends forwardly to a point substantially half way between the cultivator blades 20 and has a bearing cap designated 27 formed in its forward end. Nut and bolt assemblies designated 28 secure the bearing cap in position. The flexible element here illustrated as the chain 29 has one end secured to the bearing cap and its other end to the axle of the tractor and is a common means used to limit the downward movement of a member such as the support arm without preventing upward movement of it. An axle 30 has a spool sleeve designated 31 mounted on it which is surrounded and embraced by bearing member 32. Bearing cap 27 supports the bearing and therefore rotatably supports the axle 30. Pins 33 center the axle in the spool sleeve. Since bearing 32 is secured between the shoulders of spool sleeve 31, and bearing 32 is held in the support arm; substantially the same amount of axle 30 extends on either side of the support arm 26. Circular shield elements designated 34 are slidably mounted on ends of the axle but may be secured in any desired position thereon by means of the set screws 35 in the collars 36 which are rigidly secured to the shields in any appropriate manner, here shown as welded. Caps 37 are threadably secured on the ends of axle 30 to positively limit the outward adjustment of each shield, but may be removed if necessary in order to permit the replacement of damaged parts or to perform any necessary maintenance on the shields that would require the removal of them from the axle. Shields 34 have radially extending ridges 38 formed in them to give them rigidity and at regular intervals an I-shaped, radially extending openings 39 are formed in the shield in spaced relation to each other. These I-shaped openings leave a portion of the shield extending from the side of the opening toward its center to form deflector flange portions designated 40. The flange portions 40 have notches designated 41 at spaced intervals to permit bending the flanges even though they extend along a curved portion of the shield as shown clearly in Fig. 5.

I now come to what is probably the most important feature of my plant shield. It will be noted that the lower portions of the shield are convex when viewed from the outside. This was noted earlier in the specification in regard to the flanges 40 which must be divided in order to make bending feasible. Anyone who has run a rotating member along where dirt or a similar substance is piling up and impinging on the rotating member is aware of the fact that the wheeled member, if it is free to move upwardly, will tend to climb to the top of the piling dirt. Since the lower portions of my shield are convex, however, dirt clods falling on the shields have a surface on the shields on which they may fall and in falling exert a downward force that counteracts the effect of the tendency of the shields to climb on top of the dirt that is piled up by the shovels of the cultivator. It has also been found that the convex lower portion of the shields makes them much more efficient in throwing the dirt clods away from the plants being cultivated. As a point of interest, the shields have been known to throw clods as far as the middle of the area between the rows of young plants when the unit powering the cultivator is operated at high speed as is possible with my shields.

As the tractor 10 is maneuvered over the crops, the cultivator blades dig up the earth and some portion of it at least tends to be thrown toward young plants being cultivated. My cultivator shields prevent clods from hitting the young plants. Since the shields are rotatably mounted, they ride over the surface of the ground like wheels. The flexible chain element permits the shields to ride upwardly over obstructions if that is necessary and also permits the shields to automatically lower themselves again when the ground is level or a depression is encountered. Since there is a tendency for the dirt to be washed away from around the base of young plants, however, it is desirable to permit a certain amount of smaller pieces of dirt to pass through the shields and lodge themselves around the young plants. By adjusting the deflector flange portions 40 as desired, the appropriate amount of dirt is presented to the openings 39. These openings being of fixed size tend to restrict the dirt passing through to a predetermined size and very large clods which might damage the young sprouts are held back. Furthermore, it is possible by loosening set screws 35 to adjust both blades to the right or the left, or to move them further apart or nearer together. It is also possible to adjust the shield frame assembly on a vertical path by loosening nut and bolt assemblies 22 and reclamping the frame members 21 at a higher point on cultivator rods 19. These adjustments permit use of my shields during a larger portion of the growing season than is possible with fixed shields. Because the single support arm extends between the cultivator shields, it is kept free of weeds or the like that would tend to wrap around or become entangled in support members that approach the shields from the outside. Double frame members 21, nevertheless, offer a durable structure that is simple and therefore inexpensive to manufacture.

Some changes may be made in the construction and arrangement of my plant shield for cultivators and method of making same without departing from the real spirit and purpose of my invention, and it is my intention to cover by my claims, any modified forms of structure or use of mechanical equivalents which may be reasonably included within their scope.

I claim:

1. A rotating crop shield for use with a crop cultivator having blades that tend to throw dirt sidewise toward the crops being cultivated, said shield characterized by radially extending I-shaped openings, so that a pair of like opposed portions extend inwardly from each side toward the center of said opening, said portions being free on three sides to permit their being bent inwardly or outwardly to draw dirt through the shield or substantially to prevent any dirt from passing through the shield.

2. In a rotating crop shield for use with crop cultivators that tend to throw dirt sideways toward the crops being cultivated, a shield element characterized by radially extending openings having bendable flanges along at least one side of said opening, whereby said flanges may be selectively bent to urge a limited quantity of dirt through the openings in said shield or substantially to prevent any dirt from passing through the shield.

3. In a clod guard for use with crop cultivators that tend to displace dirt clods toward plants being cultivated, a rotatable shield element having openings therein, and deflectors radially extending and associated with said openings; said deflectors capable of being bent to increase or decrease the amount of dirt presented to openings in said shield element.

4. In a guard mechanism for use with crop cultivators to protect plants from being damaged by dirt clods displaced by the cultivator, a support arm capable of being vertically adjustably secured to a cultivator, an axle journaled in said support arm so that a free end of said axle extends to each side of said support arm, two shields laterally adjustably secured to said axle on opposite sides of said support arm respectively; said shields having openings therein, and deflectors on the sides of said openings capable of being selectively bent to regulate the quantity of dirt presented to the openings in said shields for passage through said shields.

5. In a rotary crop shield for use with a cultivator having dirt turning elements that urges at least some loose dirt toward the crops being cultivated, a substantially circular shield member having its outer portion formed concavo-convex, said concavo-convex portion having its convex portion positioned facing toward the cultivator dirt turning elements, said convex portion of said shield extending outwardly and downwardly to provide a rounded shoulder on which dirt can exert a vertically directed force, said concavo-convex portion of said shield having openings formed in it to cause restricted quantities of dirt to pass through said shield portion, and bendable flanges formed on said shield adjacent the openings on said concavo-convex portion to selectively urge dirt toward and away from the openings in said concavo-convex portion.

BENJAMIN F. GREIMAN.

REFERENCES CITED

The following references are of record in the file of this patent:

UNITED STATES PATENTS

| Number | Name | Date |
|---|---|---|
| 107,777 | Homrighouse | Sept. 27, 1870 |
| 672,536 | Newton | Apr. 23, 1901 |
| 853,798 | Jolly | May 14, 1907 |
| 1,738,230 | Capel | Dec. 3, 1929 |
| 2,433,199 | Carter | Dec. 23, 1947 |